(12) United States Patent
Gobrecht et al.

(10) Patent No.: US 9,175,775 B2
(45) Date of Patent: Nov. 3, 2015

(54) SHAFT SEAL FOR STEAM TURBINES

(75) Inventors: Edwin Gobrecht, Ratingen (DE);
Achim Hammann, Oberhausen (DE);
Dirk Knudsen, Gladbeck (DE); Karsten Peters, Wesel (DE); Jan Walkenhorst, Mülheim an der Ruhr (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 686 days.

(21) Appl. No.: 13/525,688

(22) Filed: Jun. 18, 2012

(65) Prior Publication Data

US 2012/0251294 A1    Oct. 4, 2012

Related U.S. Application Data

(63) Continuation of application No. 12/598,609, filed as application No. PCT/EP2008/054868 on Apr. 22, 2008, now abandoned.

(30) Foreign Application Priority Data

May 9, 2007 (DE) .......... 10 2007 021 742

(51) Int. Cl.
*F01D 11/00* (2006.01)
*F16J 15/32* (2006.01)
*F02C 7/24* (2006.01)

(52) U.S. Cl.
CPC ............. *F16J 15/3288* (2013.01); *F01D 11/00* (2013.01); *F02C 7/24* (2013.01); *F05D 2220/31* (2013.01); *F05D 2240/56* (2013.01)

(58) Field of Classification Search
None
See application file for complete search history.

(56) References Cited

U.S. PATENT DOCUMENTS

| | | | | |
|---|---|---|---|---|
| 1,562,019 A | * | 11/1925 | Wilkinson | .............. 384/134 |
| 4,924,817 A | | 5/1990 | Seelen | |
| 5,941,506 A | * | 8/1999 | Smith et al. | ........... 251/335.3 |
| 6,082,740 A | | 7/2000 | Estrada | |
| 6,685,190 B1 | | 2/2004 | Aksit | |
| 6,790,001 B2 | | 9/2004 | Baily | |
| 6,976,679 B2 | | 12/2005 | Goss | |
| 7,559,554 B2 | | 7/2009 | Hogg | |
| 2005/0098958 A1 | | 5/2005 | Ebert | |
| 2007/0132190 A1 | * | 6/2007 | Trabert | .................. 277/355 |

FOREIGN PATENT DOCUMENTS

| | | |
|---|---|---|
| DE | 1097451 B | 1/1961 |
| EP | 0463532 B1 | 4/1994 |
| EP | 1696155 A2 | 8/2006 |
| JP | 6026303 A | 2/1994 |
| JP | 11507427 | 12/1996 |
| JP | 2000274208 A | 10/2000 |
| JP | 3977546 B2 | 9/2007 |

* cited by examiner

*Primary Examiner* — Nathaniel Wiehe
*Assistant Examiner* — Jeffrey A Brownson

(57) ABSTRACT

A steam turbine with a shaft seal is provided. The shaft seal steam barrier is supplied with a slight excess pressure. In order to avoid complex additional devices necessary for liquefying the water vapor once again, a condensation chamber, which is sealed from the surrounding air as well as from the steam barrier chamber with brush seals, is provided between the steam barrier chamber and the surrounding air. The condensation chamber is constructed in such a manner that the heat, developing in the interior thereof, is discharged to the outside.

4 Claims, 1 Drawing Sheet

SHAFT SEAL FOR STEAM TURBINES

CROSS REFERENCE TO RELATED APPLICATIONS

This application is a continuation of U.S. application Ser. No. 12/598,609 filed Nov. 11, 2009 now abandoned which is the US National Stage of International Application No. PCT/EP2008/054868, filed Apr. 22, 2008 and claims the benefit thereof. The International Application claims the benefits of German application No. 10 2007 021 742.2 DE filed May 9, 2007. All of the applications are incorporated by reference herein in their entirety.

FIELD OF INVENTION

The present invention refers to a shaft seal for steam turbines, in which the shaft-seal sealing steam is fed with a slight overpressure.

BACKGROUND OF INVENTION

Shaft seals of steam turbines are constructed with sealing steam. The sealing steam is fed to the shaft seal with a slight overpressure. During operation, the sealing-steam system is supplied with steam from the steam turbine at a suitable pressure and temperature. When evacuating before start-up of the machine, and at low load, the sealing steam is extracted from an auxiliary steam system.

SUMMARY OF INVENTION

The sealing-steam system comprises a sealing-steam chamber which is under a slight overpressure, and a leakoff-steam chamber which is held under a slight negative pressure in relation to atmosphere. In the leakoff-steam chamber the ingressing air and a partial mass flow of the steam from the sealing-steam chamber mix together. This so-called leakoff vapor is exhausted by means of a blower. The steam which is contained herein is re-liquefied in a condenser and fed to the water-steam system. For this, a costly piping construction for the leakoff lines, including exhaust blowers, valves and leakoff steam condenser, is required.

It is the object of the present invention to disclose a shaft seal of the type referred to in the introduction, in which complex additional devices are not necessary in order to re-liquefy the leakoff vapor.

This object is achieved for the shaft seal which is referred to in the introduction by a condensation chamber being provided between the sealing-steam chamber and the surrounding air and being sealed by brush seals both in relation to the surrounding air and in relation to the sealing-steam chamber, wherein the condensation chamber is constructed so that the heat which develops therein is discharged to the outside.

As a result of the condensation directly on the turbine, the entire piping construction for the leakoff lines, including exhaust blower, valves and leakoff steam condenser, is dispensed with. Appreciable savings therefore result in the case of the shaft seal according to the invention.

Advantageous developments of the present invention result from the dependent claims and also from the description of an exemplary embodiment with reference to the attached drawing.

With reference to the attached drawing, the principle construction of a current embodiment of a shaft seal, and also the principle construction of a shaft seal according to the invention, are shown in the following.

DETAILED DESCRIPTION OF INVENTION

Figure 1:
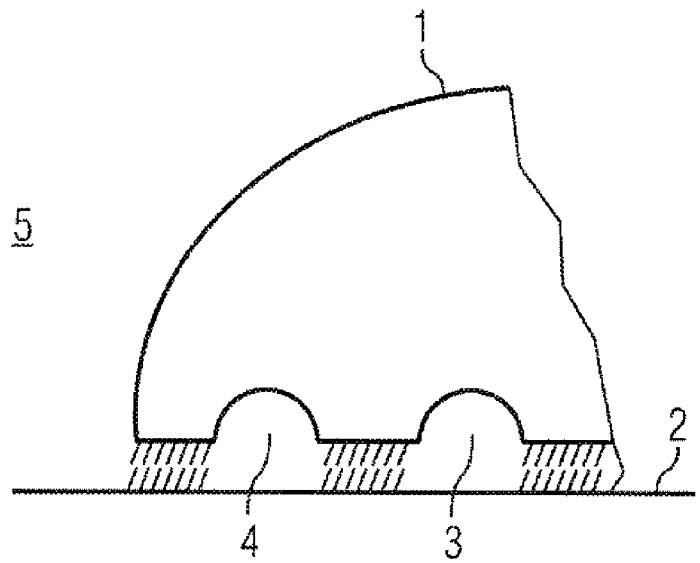
FIG. 1 shows the principle construction of a known shaft seal.

In FIG. 1, in which the prior art is shown, the turbine casing is identified by 1 and the shaft identified by 2. The shaft seal which is shown here has a sealing-steam chamber 3 and a leakoff-steam chamber 4. Seals, for example labyrinth seals, are located between the leakoff-steam chamber 4 and the surrounding air 5, and also between the leakoff-steam chamber 4 and the sealing-steam chamber 3, and also between the sealing-steam chamber 3 and the inside of the turbine.

The leakoff lines and the valves which are associated with them, and the leakoff-steam condenser, shall not be dealt with in more detail here since these are known to the person skilled in the art and these are not essential for the actual inventive idea either.

Figure 2:
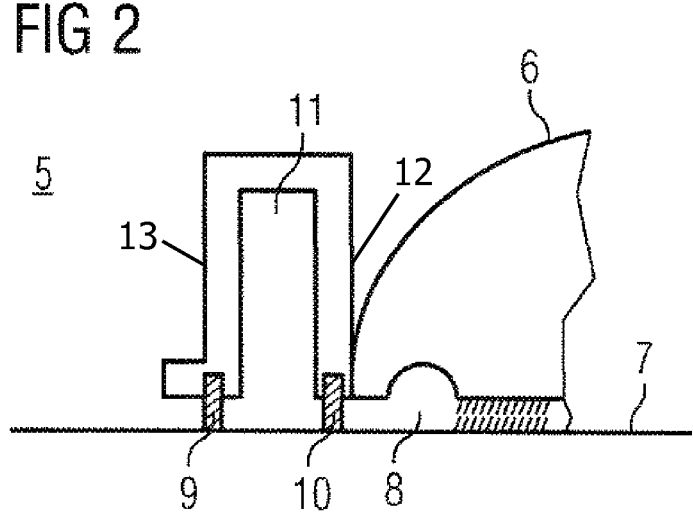
FIG. 2 shows the principle construction of a shaft seal according to the invention.

In FIG. 2, a shaft seal according to the present invention is shown in principle. The turbine casing is identified by 6 and the shaft is identified by 7. The shaft seal according to the invention has a sealing-steam chamber 8 which is sealed in relation to the inside of the turbine by a labyrinth seal.

A condensation chamber 11 is now located between the ambient air 5 and the sealing-steam chamber 8 and is sealed by brush seals 9 and 10 both in relation to the surrounding air 5 and in relation to the sealing-steam chamber 8. The condensation chamber 11 has a first side wall 12 and a second side wall 13. The first side wall 12 abuts the turbine casing 6. The condensation chamber 11 in this case is constructed so that it discharges the heat which develops therein to the outside, that is to say, it is not integrated into the actual steam turbine.

By the use of modern sealing technologies, such as the use of brush seals, only a fraction of the previous leakoff steam volume is produced. This can then be condensed directly on the steam turbine by means of the condensation chamber 11.

As a result of the condensation directly on the steam turbine the entire piping construction for the leakoff lines and also the leakoff-steam condenser, the valves and the exhaust blower, are dispensed with.

We claim:
1. A steam turbine, comprising:
a shaft seal;
a sealing-steam chamber disposed between the inside of the steam turbine and a shaft; and
a condensation chamber provided directly between the sealing-steam chamber and a surrounding air, wherein a first side wall of the condensation chamber directly abuts a turbine casing;
a plurality of brush seals,
wherein the sealing-steam chamber is fed with a slight overpressure,
wherein the condensation chamber is sealed by the plurality of brush seals both in relation to the surrounding air and in relation to the sealing-steam chamber, wherein the condensation chamber is constructed so that heat which develops therein is discharged to the outside, and wherein steam is condensed directly on the steam turbine via the condensation chamber.

2. The steam turbine as claimed in claim 1, wherein the condensation chamber is fixed with a flange and wherein insulating layer is arranged between the condensation chamber and the steam turbine.

3. The steam turbine as claimed in claim 1, wherein the condensation chamber is cast onto the steam turbine and insulated in relation to the steam turbine.

4. The steam turbine as claimed in claim 1, wherein the sealing-steam chamber is sealed in relation to the inside of the steam turbine by a labyrinth seal.

\* \* \* \* \*